United States Patent
Thierauf et al.

(10) Patent No.: US 11,960,251 B2
(45) Date of Patent: Apr. 16, 2024

(54) PARAMETERIZATION OF A COMPONENT IN AN AUTOMATION SYSTEM

(71) Applicant: Festo SE & Co. KG, Esslingen (DE)

(72) Inventors: Martin Thierauf, Stuttgart (DE); Thomas Ruschival, Esslingen (DE); Dominic Kraus, Stuttgart (DE)

(73) Assignee: Festo SE & CO. KG, Esslingen (DE)

( * ) Notice: Subject to any disclaimer, the term of this patent is extended or adjusted under 35 U.S.C. 154(b) by 149 days.

(21) Appl. No.: 17/113,039

(22) Filed: Dec. 5, 2020

(65) Prior Publication Data
US 2021/0116899 A1    Apr. 22, 2021

(30) Foreign Application Priority Data
Feb. 5, 2020    (DE) ..................... 10 2020 102 863.6

(51) Int. Cl.
*G05B 19/418*    (2006.01)
*G05B 13/02*    (2006.01)
(Continued)

(52) U.S. Cl.
CPC ... *G05B 13/0265* (2013.01); *G05B 19/41865* (2013.01); *G05B 19/41885* (2013.01); *G06F 18/2148* (2023.01); *G06N 3/08* (2013.01)

(58) Field of Classification Search
USPC .......................................................... 700/29
See application file for complete search history.

(56) References Cited

U.S. PATENT DOCUMENTS 6,226,760 B1 *   5/2001   Burkhardt ................ G07C 3/08
                                                               703/22
6,529,780 B1 *   3/2003   Soergel ................ G05B 13/027
                                                               700/19
(Continued)

FOREIGN PATENT DOCUMENTS

DE    202017102235 U1    6/2017
EP    1703110 A1    9/2006
(Continued)

OTHER PUBLICATIONS

Serkan Kiranyaz, et al. 1D Convolutional Neural Networks and Applications A Survey, 2019.
(Continued)

*Primary Examiner* — Jason D Mitchell
(74) *Attorney, Agent, or Firm* — Ewers IP Law PLLC; Falk Ewers (57) ABSTRACT

A method for testing a basic parameterization of a component in an automation system is provided. The method includes: starting a test run of the component in the automation system with the basic parameterization, measuring of a measured value data record during trial operation, access to a machine learning module comprising a pre-trained neural network, wherein the pre-trained neural network is pre-trained to calculate a target parameterization for the respective component for a measured value data set, wherein the basic parameterization is compared with the calculated target parameterization and in the event of deviation a result message for adapting the basic parameterization is provided, and receipt of the provided result message for adaptation of the basic parameterization.

21 Claims, 4 Drawing Sheets

(51) Int. Cl.
 *G06F 18/214* (2023.01)
 *G06N 3/08* (2023.01)

(56) References Cited

U.S. PATENT DOCUMENTS

| | | | |
|---|---|---|---|
| 11,468,698 B1 * | 10/2022 | Kim | G06N 3/02 |
| 2010/0145509 A1 | 6/2010 | Zhang et al. | |
| 2014/0335480 A1 | 11/2014 | Asenjo et al. | |
| 2015/0363691 A1 * | 12/2015 | Gocek | G06N 3/02 |
| | | | 706/16 |
| 2016/0274558 A1 * | 9/2016 | Strohmenger | G05B 15/02 |
| 2016/0346928 A1 | 12/2016 | Zhang et al. | |
| 2017/0032281 A1 | 2/2017 | Hsu | |
| 2017/0235857 A1 * | 8/2017 | Haye | G06N 3/088 |
| | | | 703/7 |
| 2018/0222048 A1 | 8/2018 | Hasegawa | |
| 2018/0222058 A1 | 8/2018 | Mizobe et al. | |
| 2018/0225113 A1 | 8/2018 | Hasegawa | |
| 2019/0001489 A1 | 1/2019 | Hudson et al. | |
| 2019/0054873 A1 | 2/2019 | Liongosari et al. | |
| 2019/0121350 A1 | 4/2019 | Cella et al. | |
| 2019/0137985 A1 | 5/2019 | Cella et al. | |
| 2019/0354892 A1 * | 11/2019 | Hagihara | G06N 3/0454 |
| 2020/0103877 A1 * | 4/2020 | Truong | G05B 19/41865 |
| 2020/0103878 A1 * | 4/2020 | SayyarRodsari | |
| | | | G05B 19/41885 |
| 2020/0201290 A1 | 6/2020 | Bischoff et al. | |
| 2020/0310405 A1 * | 10/2020 | Kraus | G05B 23/024 |
| 2020/0356011 A1 * | 11/2020 | Su | G03F 7/705 |
| 2020/0371509 A1 * | 11/2020 | Mark | B29C 64/386 |
| 2021/0049032 A1 * | 2/2021 | White | H04L 67/12 |
| 2021/0056416 A1 * | 2/2021 | Kato | G06N 3/08 |
| 2021/0060790 A1 * | 3/2021 | Semsar | G06V 10/82 |
| 2021/0089003 A1 * | 3/2021 | Guerrier | G06N 3/08 |
| 2021/0089878 A1 * | 3/2021 | Greenewald | G06N 3/082 |
| 2021/0116899 A1 * | 4/2021 | Thierauf | G06K 9/6257 |
| 2021/0158095 A1 * | 5/2021 | Büttner | G06K 9/6257 |
| 2021/0181695 A1 * | 6/2021 | Feng | G06N 20/00 |
| 2021/0191347 A1 | 6/2021 | Bischoff et al. | |
| 2021/0271972 A1 * | 9/2021 | Groh | G06N 3/08 |
| 2021/0356946 A1 * | 11/2021 | Bock | G05B 19/41885 |
| 2021/0385682 A1 * | 12/2021 | Bedekar | G06N 3/105 |
| 2022/0011727 A1 * | 1/2022 | Hlavac | G05B 13/0265 |
| 2022/0179374 A1 * | 6/2022 | Kaberg Johard | G05B 13/027 |

FOREIGN PATENT DOCUMENTS

| | | |
|---|---|---|
| EP | 2801938 A1 | 11/2014 |
| WO | 2019002349 A1 | 1/2019 |
| WO | 2019076511 A1 | 4/2019 |

OTHER PUBLICATIONS

Office Action issued in German Patent Application No. DE 10 2020 102 863.6, dated Sep. 23, 2020 (from which this application claims priority), and English language translation thereof.

Brynjolfsson et al., "What can machine learning do? Workforce implications". sciencemag.org, (Dec. 22, 2017), pp. 1530-1534, vol. 358, Issue 6370, DOI: 10.1126/science.aap8062, American Assocation for the Advancement of Science, 1200 New York Avenue NW, Washington, DC 20005.

Chang et al., "A Review of Artificial Intelligence Algorithms Used for Smart Machine Tools". MDPI Inventions, https://doi.org/10.3390/inventions3030041, (Jun. 27, 2018), pp. 1-28, vol. 3, Issue 41, Department of Mechanical Engineering, National Chung Hsing University, Taichung 40227, Taiwan.

Khanum et al., "A Survey on Unsupervised Machine Learning Algorithms for Automation, Classification and Maintenance". International Journal of Computer Applications (0975-8887), (Jun. 2015), pp. 34-39, vol. 119, Issue 13, Department of Sofrware Engineering, Fatima Jinnah Women University, Pakistan.

Marcolino et al., "Detecting Anomalies in Humanoid Joint Trajectories". 2013 IEEE/RSJ International Conference on Intelligent Robots and Systems (IROS), (Nov. 3-7, 2013), pp. 2594-2599, DOI: 10.1109/IROS.2013.6696722, Tokyo, Japan.

* cited by examiner

PARAMETERIZATION OF A COMPONENT IN AN AUTOMATION SYSTEM

CROSS REFERENCE TO RELATED APPLICATIONS

This application claims priority to German patent application DE 10 2020 102 863.6, filed Feb. 5, 2020, the entire content of which is incorporated herein by reference.

TECHNICAL FIELD

The disclosure relates to the parameterization of a component (e.g., an electric or pneumatic actuator) in an automation system before the component is put into operation.

BACKGROUND

The commissioning of components in automation technology usually requires a parameterization of the components to achieve an adaptation to the intended purpose. The components are thereby adapted to the concrete problem definition, e.g., masses to be moved, travel speeds etc. In particular, the mass to be moved must be parameterized, e.g., with controlled drives. This requires a certain know-how on the part of the customer. For this reason, various support services are currently offered to facilitate commissioning. For example, special design tools based on the customer's basic application parameters provide customized system configurations and parameter sets before commissioning. Incorrect configuration of control parameters may lead to malfunctions of the machine, potentially with damage to the plant.

For example, there is a configuration software (e.g., Festo Automation-Suite) known in the state of the art, which offers a commissioning wizard for special automation systems, namely for electric drives, which guides the user through the parameterization of the components and provides assistance. However, the customer must determine and enter all values himself. For electric drives, an 'autotuning' mode is used, which can determine certain system parameters. The disadvantage of this mode is that the customer has to determine and transmit all necessary data locally and manually. If too little or wrong data is selected here, the assistance can only be deficient or not at all. Furthermore, data or information obtained locally at a specific plant cannot be used globally—and thus sometimes also for other plants. This is where the present disclosure comes in.

The problem of the previous assistance is that know-how of the plant operator is always required and therefore a manual method or at least a manual check is necessary.

SUMMARY

Based on the situation described above, it is an object of the present disclosure to better support the customer before and during the commissioning of a component in an automation plant. In particular, an automatic parameterization of the component in the respective environment of the application should be possible. Furthermore, it should be possible to provide parameterization for all types of systems, e.g., not only for electric drives but also for pneumatic systems. Furthermore, the method should not depend on the selection and (possibly manual) provision of the customer's data.

This task is solved by a method for checking a basic parameterization, a parameterization unit, and a component with such a parameterization unit as described herein.

In a first aspect, the disclosure relates to a computer-implemented process which is carried out locally on site and in particular directly on a component (i.e., in the automation system) and is intended for testing a—in particular factory-set—basic parameterization of a component in the automation system. The following process steps are carried out before or during the commissioning of the component in the automation plant: starting or starting a test run of the component in the automation system with the basic parameterization, measurement of a measured value data set during test run (with basic parameterization), access to a machine learning module, which may comprise a pattern recognition algorithm and/or a pre-trained neural network, wherein the pre-trained neural network (hereinafter also referred to as ANN for 'artificial neural network') is pre-trained in order to calculate a target parameterization for the respective component for a measured value data record and wherein the basic parameterization is compared with the calculated target parameterization and in the event of deviation a result message for adapting the basic parameterization is provided, and receipt of the provided result message to adjust the basic parameterization.

The method described here has the advantage that commissioning can be further automated and simplified. Based on signals recorded during commissioning, which represent the concrete and real operation of the component in the plant, recommendations for the optimization of the parameters used can be calculated and output specifically for the respective use of the component in the plant. The method described here has the further advantage that it can be applied independently of the plant type.

A typical application of the disclosure is in the field of pneumatics, especially the adaptation of the basic parameterization of controlled pneumatic valves. For this purpose, an application parameterization is required which can be verified according to the proposal. Servopneumatics requires other adaptations than the control of electric servo drives, since the control algorithms are much more complex due to the compressible medium air. In a typical training, the method for pneumatic systems can be optimized, e.g., for minimum air consumption and make suggestions for the optimal design of the components.

In a typical version of the disclosure, the machine learning module is continuously retrained with the continuously recorded measured value data set, the basic parameterization and the calculated target parameterization. The machine learning module thus stores a model which is self-learning and is fed with continuously newly measured data and continuously "continues learning". The model can be used advantageously for other systems and/or for creating a basic parameterization.

In a further exemplary embodiment of the disclosure, it may be provided that a specific machine learning module is provided and pre-trained for individual, selected components, in particular for complex components. In a configuration phase, the components for which, for example, a specific ANN is to be trained can thus be selected and determined. Thus, the method can provide, e.g., a basic parameterization for simple components and/or a specifically adapted parameterization and/or optimization of the basic parameterization for selected components (e.g., a control node, like a SPS/PLC).

In an advantageous further training of the disclosure, the ANN and/or the machine learning module is trained or pre-trained with laboratory data and/or data from test benches and/or data from at least one simulation model. Thus, a larger data basis can be used for the pre-training of the network, in particular the data from tests of the component and/or plant manufacturer can be used. The customer, who wants to operate the component and plant, usually does not have extensive data at the time of commissioning. Therefore, an improved and specific parameterization can be provided at an earlier point in time.

In another, advantageous further training of the disclosure, the machine learning module comprises a pattern recognition algorithm trained to automatically recognize error patterns in the basic parameterization, in particular errors or a disadvantageous parameterization for the specific use of the component in the plant for the respective automation task. This includes, for example, conclusions from the detected oscillation behavior, the time/velocity of reaching an end position, etc. The recorded measured values (ACTUAL data set) can be analyzed in relation to the reference values (NOMINAL data set) measured in the laboratory, possibly in advance, in particular with a pattern recognition algorithm (this will be explained in more detail below), in order to draw conclusions about an error pattern based on this analysis. The model can be designed to differentiate good patterns from error patterns. In a typical design, a set of measured signal characteristics is normalized, and certain patterns are recognized in it. Thus, no pure threshold analysis is performed, but typically a pattern recognition on several time-dependent signals.

In an exemplary embodiment of the disclosure, the machine learning module may be adapted to apply at least one pattern recognition algorithm to the measured value data set. The pattern recognition algorithm can, for example, be applied to the measured values and can be designed to differentiate between good and defective cases. Examples of concrete patterns that can be meaningfully recognized are: tendency of the system to oscillate, too 'hard' travel to an end position, or tracking error due to incorrect interpretation of the application parameters.

In a further exemplary embodiment of the disclosure, the machine learning module can comprise a component test unit which is trained to test whether the correct or suitable component is used in the automation system at all in order to fulfill a given automation task and, in the negative, extends the result message with an exchange message (for the exchange of the component). The exchange message can also include a set of improved parameters, which replaces the parameter set if required and/or in particular in response to a confirmation signal that can be entered at the component or at a control unit of the plant (Basic parameterization-→Improved parameterization). Typically, the component test unit includes a parameter analysis unit which—as explained above—is designed to detect certain problems in the parameterization. For example, a torque limitation can be detected to be too low. The component test unit can then suggest a larger motor.

In a further exemplary embodiment of the disclosure, the machine learning module can be at least partially formed locally on the component or on selected components. This has the advantage that each (each of the selected) components can act and decide autonomously. The component can thus parameterize itself autonomously and overwrite, e.g., the factory-set basic parameterization. However, this requires a high computing power on the local component. The local component can also be designed as an embedded system or include such a system. The component can be designed with or without special hardware acceleration.

In an alternative exemplary embodiment of the disclosure, the machine learning module can also be trained on a server, e.g., centrally. The server can be, for example, the server of the manufacturer of the component. The server can be trained in the cloud. This has the advantage that the collected and learned knowledge about the specific system can be made available for use by other system operators in an anonymous or more abstract form.

The method can also be implemented as a distributed system. Accordingly, first method steps are implemented and executed on a first unit and second method steps are implemented and executed (distributed) on a second unit. Typically, the evaluation (inference) in the commissioning tool (local, on the plant) and the learning (from samples) should be executed on a central server (e.g., of the manufacturer of the component/system). The evaluation can thus be executed locally on the component. Then appropriate diagnostic messages are sent to inform the operator about suboptimal parameter settings. An advantageous further training of the disclosure provides for a preprocessing of data on the component. Data preparation, such as filtering or averaging, is particularly necessary for high-frequency signals, such as motor currents. An evaluation of the signals in the frequency domain, i.e., an evaluation of the spectrum of the signals, e.g., by applying a Fast Fourier Transformation, is typical. An evaluation on the component also requires an intermediate storage of signals over a certain period of time. Therefore, the local component typically has a data storage.

Typically, existing configuration and engineering interfaces are used. It is not necessary to implement new IoT or data collection interfaces. This can significantly reduce the installation effort.

Furthermore, in a further exemplary embodiment of the disclosure, special test sequences are run for commissioning to obtain relevant data. In this context, it is explicitly pointed out that the data collected in this process is not operational data and the data collection is therefore different from data collection during operation.

The recorded or measured values are basically not limited to a certain type or type of measured values. For example, the measured value dataset may include digital and/or analog signals and/or signal characteristics over time. The measured values can be acquired by different sensors within the automation system (position sensors, end position sensors, speed or temperature sensors or sensors of other types). The sensors do not necessarily have to be mounted directly on the component.

Another object solution is a computer program, with computer program code to perform all method steps of the above-described method, if the computer program is executed on a computer or a computer-based electronic instance (e.g., microcontroller, PLC). It is also possible that the computer program is stored on a medium readable by a computer.

The solution of the object was described above using the method. The mentioned features, advantages or alternative designs can be transferred analogously to the other claimed subject matters and vice versa. In other words, also the apparatus claims (which are for example directed to a parameterization unit or a component) can be further developed with the features which are described or claimed in connection with the method. The corresponding functional features of the method are thereby formed by corresponding apparatus modules of the device, in particular by hardware modules or microprocessor modules, and vice versa. To avoid redundancies at this point, these alternative implementations of the device claims are not explicitly repeated again.

In a further aspect, the present disclosure relates to a parameterization unit for a component of an automation system which is adapted to carry out the method as described above. The parameterization unit comprises: a parameter interface for reading a basic parameterization, sensors for measuring data or signals, and/or at least one measured value interface for reading in a measured value data set. This means that the parameterization unit does not necessarily have to include the sensors for data acquisition itself, but alternatively or cumulatively only needs to include an interface via which the respective sensor data signals (measured values) are read in. The sensors could, for example, be located at another component in the automation system. An interface to a machine learning module, via which a result message can be read in to adapt the basic parameterization with a target parameterization. A processor for controlling and operating the component with the basic parameterization and/or target parameterization.

In a further aspect, the present disclosure relates to a component in an automation system with such a parameterization unit. The component may comprise a control unit and in particular a controller for an electrical or a pneumatic system. The automation system may also comprise an electric and/or pneumatic actuator.

In the following, the terms used in this application are defined in more detail.

The 'measurement dataset' is a digital dataset that can be processed electronically and is based on measured physical quantities or values. The measured values are recorded by different sensors and can refer to different physical quantities (such as temperature, position, pressure curves or other signal curves over time etc.). The sensors can be located directly on the component to be tested or at another position in the automation system, e.g., on a component that interacts with and/or is controlled by the component (e.g., controller).

The automation system can include pneumatic and/or electric actuators. The automation system can be an electronically controlled system for different purposes with a variety of physical or technical components, such as a production plant or a production line or a machine or a group of machines.

The components are technical parts or field devices that can be controlled electronically. The components can in turn have component parts of different types, such as analog components (valves, switches, etc.) and digital components (e.g., a software-based control unit, such as a PLC, etc.). Depending on the functionality and automation task of the entire plant, the components are interconnected according to a circuit diagram in order to form a functional connection. In this way, for example, an effect chain can be formed from several components connected in series. However, more complex structures (comprehensive cyclic or net-like component structures) can also be formed. The components can include sensors. They can also be designed with interfaces to read in sensor signals and/or measured values from other components and parts.

The machine learning module is an electronic unit that can be trained in software and/or hardware. The machine learning module can include a pattern recognition algorithm in one version, which is applied to the acquired measurement data. The machine learning module can comprise a pre-trained or trained neural network and, if necessary, other machine learning methods. The machine learning module can be trained on a server and can be connected to a database.

A trained neural network, also known as artificial neural network (ANN), is a computer-implemented method for calculating an optimized parameter data set (target parameterization). The ANN is based on training data obtained from laboratory and/or simulation data. The training data comprise input data and output data. The input data comprise the measured value data acquired from one component each. The output data comprise "optimal" parameterization. The network is trained on the basis of this training data in such a way that it calculates the target parameterization for any measured value data of a component. A supervised training method can typically be used for the training method. Further training also provides for unsupervised training. A one-dimensional convolutional neural network is typically used for the analysis of time-limited signal courses. For details about the implementation please refer to: Kiranyaz, Serkan & Avci, Onur & Abdeljaber, Osama & Ince, Turker & Gabbouj, Moncef & Inman, Daniel., 1D Convolutional Neural Networks and Applications (2019). As alternative methods, recurrent neural networks (RNN) or long-short term memory (LSTM) and their variants can be used.

The basic parameterization is a set of parameters that are preset at the factory. Thus, a certain standard parameterization can be delivered with a component, but it is not yet designed for the specific automation task. If this component is then operated in the plant in a trial run, measured values are recorded and analyzed during the trial run. These measured values are compared with reference values of an optimally parameterized component in order to provide a target parameterization as a result of the machine learning process.

The result message can be a signal in the simplest case. Alternatively, the result message can be a message packet that signals that the existing parameterization of the component has to be adapted or optimized. Typically, the result message contains the target parameterization with which the existing parameterization (basic parameterization or changed) is to be overwritten. For this purpose, the result message can be displayed on a user interface with the request to enter a confirmation signal that triggers the overwriting.

The parameterization unit is an electronic instance. It is used to execute the parameterization method.

BRIEF DESCRIPTION OF THE DRAWINGS

The disclosure will now be described with reference to the drawings wherein.

DESCRIPTION OF EXEMPLARY EMBODIMENTS

In the following detailed description of the figures, non-restrictive design examples are discussed with their characteristics and further advantages based on the drawing.

The disclosure provides a feedback mechanism which is based on algorithms of artificial intelligence and calculates suggestions for improvement of the previous or current parameterization (component parameterization, application parameterization) based on previous experience—especially about the component. Patterns in sensor data are recognized by pattern recognition algorithms to generate recommendations without exact knowledge of the complete physical structure of the system. These algorithms are implemented in a machine learning module and make the component and application know-how of the component manufacturer accessible to the customer in order to optimize application and component parameters. In this process, previously known patterns in sensor data are recognized and, based on this, recommendations are communicated to the user in the form of a result message. The idea here is to make the comprehensive expert knowledge from the development and testing of the component available to the customer via problematic patterns or conspicuities in sensor data. A library of pre-trained models can be provided.

The training of the machine learning algorithms can be based on existing measured values, e.g., from continuous runs, or on signal characteristics generated by simulation models. With these methods the basic parameterization of components can be verified in the field. In addition, the component selection can be checked and, if necessary, a recommendation can be made. As an example, the commissioning of a motor controller for, e.g., permanent magnet excited synchronous machine servo motors (PMSM) is described in the following.

For commissioning, a number of specific application parameters must be entered. This can be carried out via a commissioning software. A set of measured signals can be recorded to verify the parameterization. The set typically includes at least the following variables: conditioned motor currents, (DC-link) voltages, speed, speed change and acceleration, temperatures and other derived variables. In addition, the setpoint specifications are also recorded. These signals are used as input (features) for an analysis function. Thereby certain predefined (e.g., undesired) patterns are recognized, e.g., tendency to oscillate. Thereupon a corresponding recommendation can be given.

By using AI algorithms, it is possible to make statements about the parameterization and the correct use of components without knowing an exact physical model of the application.

Figure 1:
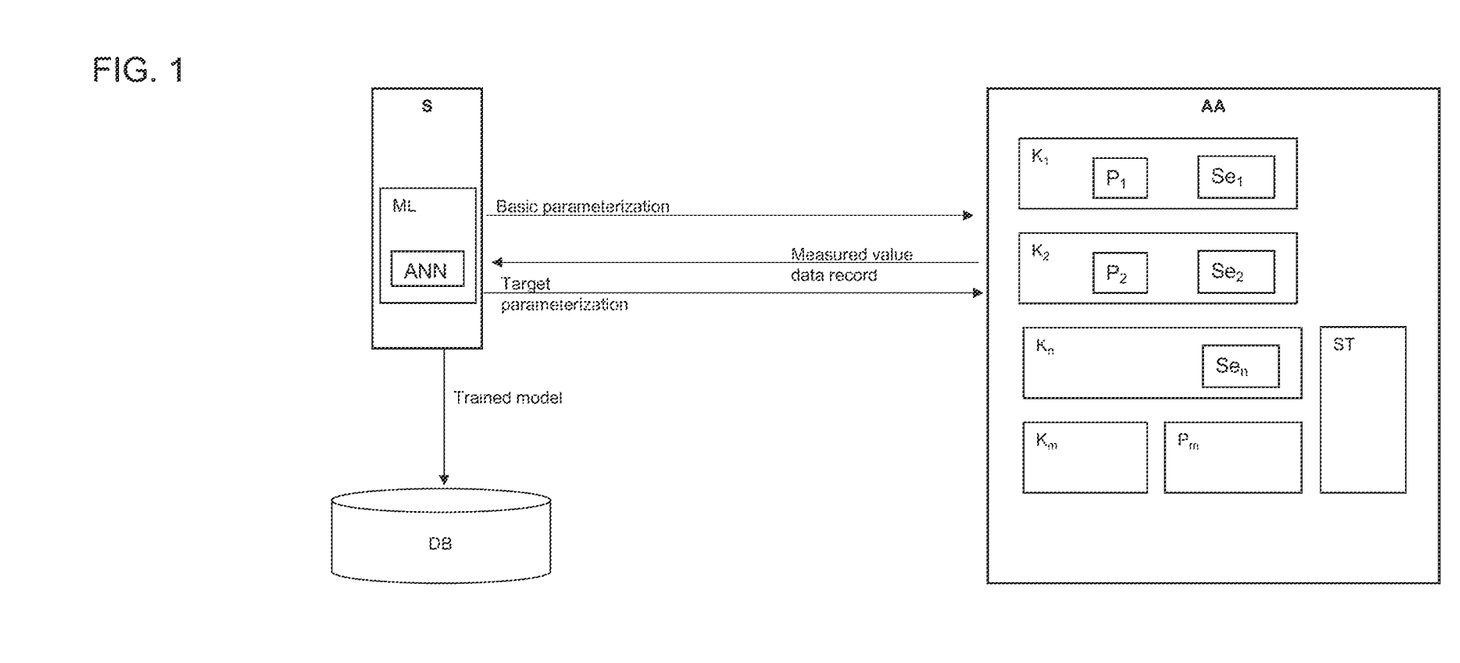
FIG. 1 is a block diagram of a device according to an exemplary embodiment of the disclosure.

FIG. 1 shows a schematic representation of an automation system AA (in the following also briefly referred to as system AA), in particular a system with pneumatic actuators, which is in data exchange with a server S at least temporarily—in particular during the commissioning of a component K. The server S can be a computer instance that is installed inside or typically outside a domain of the plant AA. The Server S can be operated, for example, by a component manufacturer or by the manufacturer of the AA system.

On the server S, a machine learning module ML is implemented, which can include a neural network ANN. The machine learning module ML can be trained to generate a model for the parameterization of components K. The generated model can be stored in a database DB.

As schematically indicated in FIG. 1, there are different design variants on the side of the AA system. Basically, the AA system comprises a large number of different components K, such as various field devices and controls (PLC etc.). All or selected components K can include a parameterization unit P, as shown in FIG. 1 as an example for the components K1 and K2. The component can be designed directly with sensors Se to acquire measured values on component K. However, components K can also be designed which, for example, have so few computer resources that it does not make sense to design their own local parameterization unit P. In this case, the measured values of component $K_n$ (in FIG. 1) can be passed on to a higher-level control unit ST, which then comprises a parameterization unit P and performs the parameterization check on behalf of the respective components $K_n$, so to speak. Alternatively, another parameterization unit P which is not assigned to or installed on the respective component can also carry out the parameterization check for a "foreign" component. As also shown in FIG. 1, it is possible that the parameterization unit P is not implemented directly on component K but is assigned to K as a separate component or separate instance of the components and has corresponding data connections for data exchange.

The basic parameterization can be supplied by the factory when the components K are delivered and is thus available as a data record on the component K or can be read in from a central server S via a data connection (typically a wireless connection, e.g., radio). The measured values measured on the component K or by it are transmitted in the form of a measured value data record to the machine learning module ML, which then accesses the trained network ANN with these data in order to calculate a target parameterization. This can be transmitted from the server S to the component K, e.g., in response to a signal, so that the parameterization can be adapted and optimized for the respective automation task locally on the component K.

Figure 2:
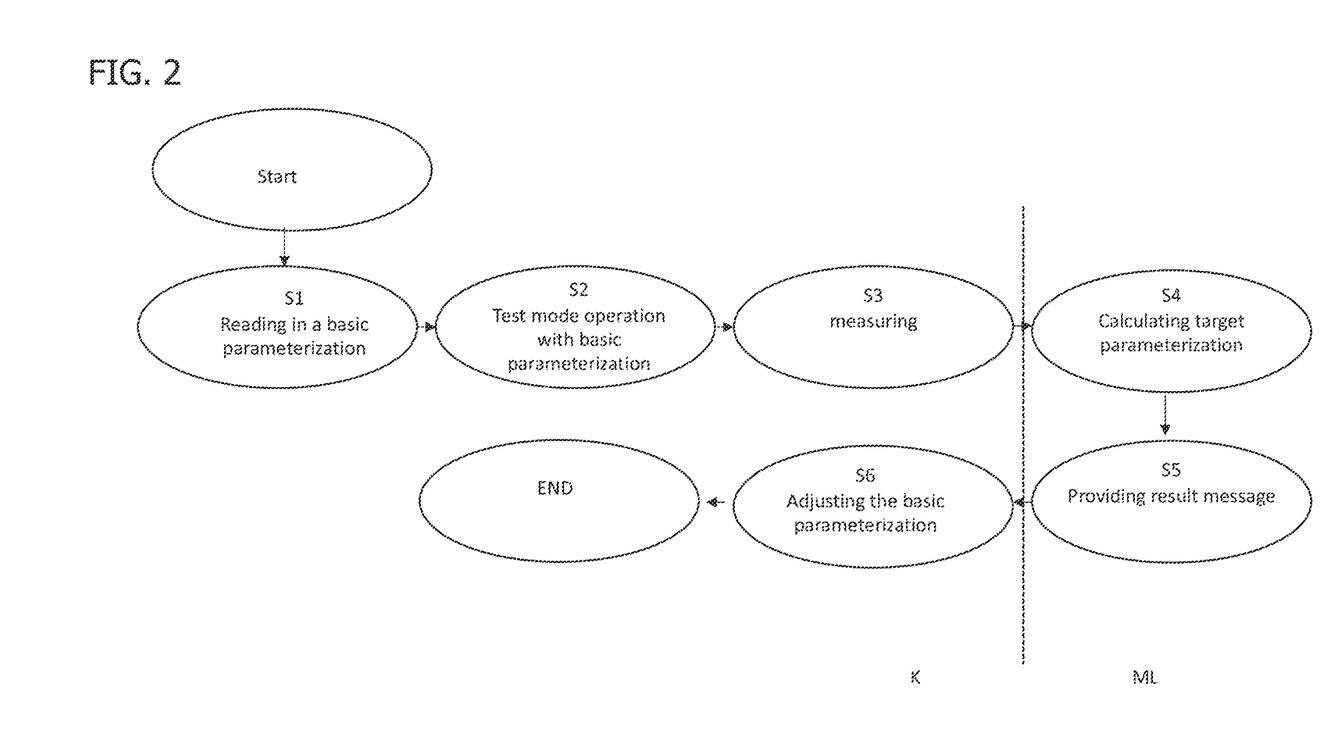
FIG. 2 is a flow chart of a process according to an exemplary embodiment of the disclosure.

FIG. 2 shows a flow chart in an exemplary embodiment of the disclosure. After starting the process on component K, the basic parameterization is read in step S1. This can be done from a memory on component K or via a data connection with access to a central server S. Afterwards, the system AA is operated in test mode with the basic parameterization. In step S3, measured values are measured and/or recorded. Here, for example, it is recorded when certain actuators reach their respective end positions, how the pressure curve is, etc. Samples are extracted from the recorded measured values or signals and detected, such as an excessively abrupt stop in the end position in pneumatic actuators with position measurement or a tendency of controlled signals to oscillate or excessive deviation of setpoint/actual value in controlled signals or unexpected force curves in press applications in certain situations or unexpectedly high friction with an incorrect mechanical design, which may indicate an incorrectly dimensioned component.

In step S4 the pre-trained neural network ANN is accessed with the measured values to determine the target parameterization. A machine learning model pre-trained for the respective component K thus analyzes the acquired sensor data or measured values and tries to recognize certain patterns that indicate optimization potential. Based on the anomalies found, recommendations are displayed in the form of a result message to the user (operator of the AA machine with the respective component K). On the basis of the results found, recommendations are displayed to the user in order to optimize parameters. If the target parameterization differs from the basic parameterization, further steps can be initiated by accessing a set of rules (which can be stored, e.g., in a rule base). For example, if a deviation is considered relevant, a result message can be created that includes a set of commands that initiate or instruct an adjustment of the basic parameterization on component K. Afterwards the method can end or be repeated after a predetermined time unit. For example, the process can be repeated in order to check the executed parameter changes.

It is also possible to store rules that trigger a new overwriting of the previous parameterization (e.g., too high deviation of measured values or after a 'reboot' of a component and/or the system etc.). In FIG. 2 a vertical dotted line is drawn. This line indicates that the steps to the left of the line can be executed on the component K and the steps to the right of the line on the machine learning module ML. Alternatively, all steps can be executed on component K or the machine learning module ML can be installed directly on component K.

Figure 3:
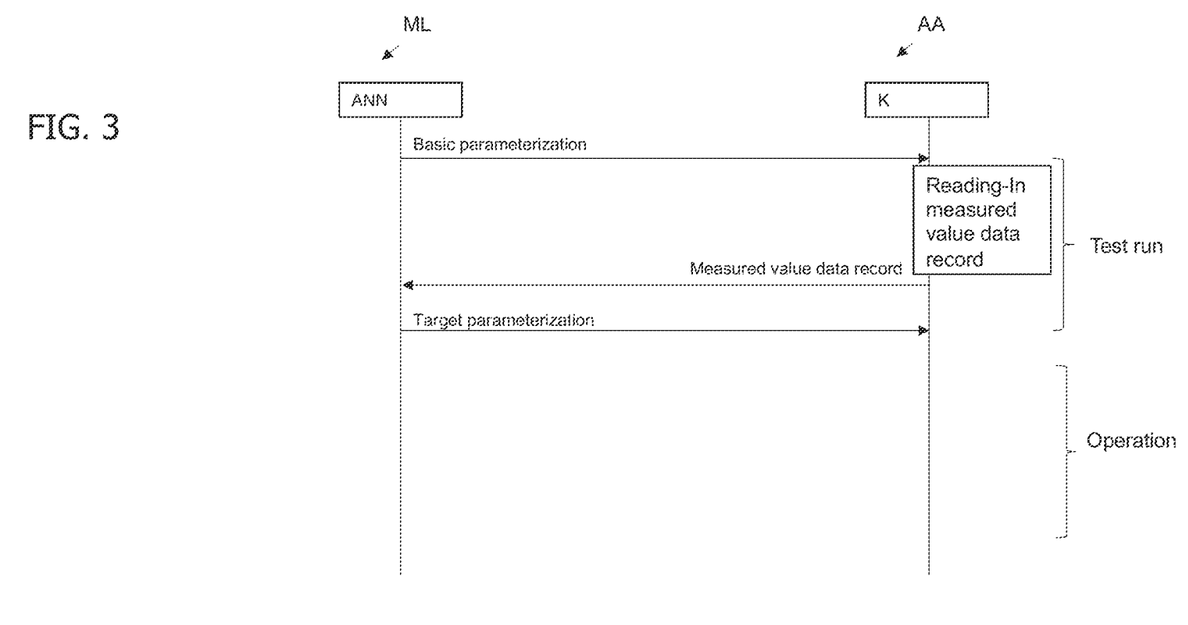
FIG. 3 is a sequence diagram with a signal exchange between participating instances according to an exemplary embodiment of the disclosure.

FIG. 3 shows in an interaction diagram which data is exchanged between the individual components. The basic parameterization is usually received and read by a server S. During the test run, measured values are measured and read in or recorded and transmitted to the network ANN in order to calculate the target parameterization, which in turn is transmitted to the component K. Thereupon the previous parameterization (e.g., the basic parameterization) can be overwritten to start productive operation of the plant AA.

Figure 4:
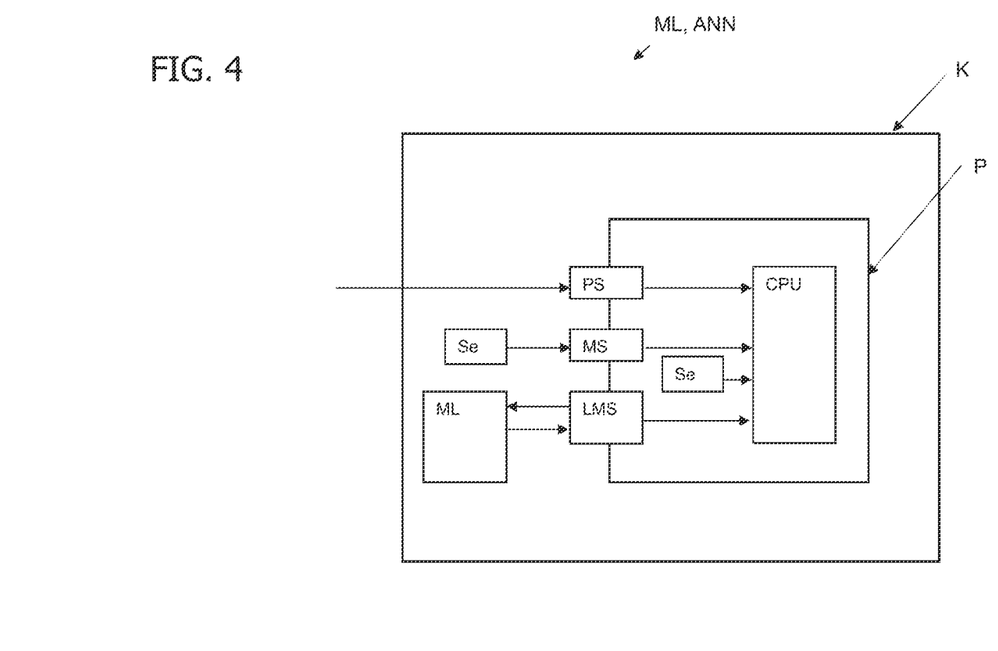
FIG. 4 is a schematic block diagram of a component with further components according to another exemplary embodiment of the disclosure.

FIG. 4 shows in the form of a block diagram a component K, which is designed with a parameterization unit P. In this design example, the parameterization unit P comprises three interfaces: a parameterization interface PS, which is intended to read in the basic parameterization, a measured value interface MS, via which measured values from sensors Se are read in, which are not arranged in or on component K, and a learning module interface LMS to the machine learning module ML, whereby the target parameterization or the result message is read in via the learning module interface LMS. In this execution example, the learning module ML is implemented directly in component K. Alternatively, it can also be implemented on an external server and/or in the cloud and be accessible via a corresponding network connection. The parameterization unit P can also include local sensors or transducers and be equipped with an electronic processing unit CPU.

In conclusion, it should be noted that the description of the disclosure and the exemplary embodiments are basically not to be understood as restricting with regard to a certain physical realization of the disclosure. All features explained and shown in connection with individual embodiments of the disclosure may be provided in different combinations in the subject matter of the disclosure in order to realize its advantageous effects at the same time.

The scope of protection of the present disclosure is given by the following claims and is not limited by the features explained in the description or shown to the figures.

In particular, it is obvious to a person skilled in the art that the disclosure can be applied not only to pneumatic actuators and components, but also to other types of automation equipment (electrical equipment). Furthermore, the parts of the component and/or the parameterization unit can be realized distributed over several physical products.

LIST OF REFERENCE NUMERALS

AA Automation plant
K Component
P Parameterization module
ML machine learning module
ANN neural network
PS Parameter interface
MS Measured value interface
LMS Learning module interface
CPU Processor, computing unit
Se Sensor

What is claimed is:

1. A method for testing a basic parameterization of a component in an automation system, in which the following method steps are carried out before or during commissioning of the component in the automation system:

starting a test run of the component in the automation system with the basic parameterization, wherein the component is a technical part or field device that is electronically controllable;
measuring of a measured value data record during trial operation;
assessing a machine learning module, which is pre-trained in order to calculate a target parameterization for the respective component for a measured value data set and wherein the basic parameterization is compared with the calculated target parameterization and in the event of deviation a result message for adapting the basic parameterization is provided, wherein a specific machine learning module is pre-trained for each individual component, wherein the machine learning module is trained to automatically recognize error patterns in the basic parameterization, and wherein:
  (a) an excessively abrupt stop in an end position in pneumatic actuators with position measurement, or
  (b) a tendency of controlled signals to oscillate, or
  (c) excessive deviation of a setpoint or actual value in controlled signals, or
  (d) unexpected force curves in press applications, or
  (e) unexpectedly high friction with an incorrect mechanical design is indicative of an incorrectly dimensioned component; and
receiving the provided result message for adaptation of the basic parameterization.

2. The method according to claim 1, wherein the machine learning module is continuously retrained with the continuously acquired measured value data set, the basic parameterization and the calculated target parameterization.

3. The method according to claim 1, wherein the machine learning module comprises a pre-trained neural network which is trained with laboratory data and/or data from test stands and/or data from at least one simulation model.

4. The method according to claim 1, wherein the machine learning module is trained to automatically recognize error patterns in the basic parameterization.

5. The method according to claim 1, wherein the machine learning module is designed to apply at least one pattern recognition algorithm to the measured value data set.

6. The method according to claim 1, wherein the machine learning module comprises a component test unit which is trained to test whether the respective component is correctly inserted in the automation system in order to fulfill a predetermined automation task and, if the answer is no, extends the result message with an exchange message.

7. The method according to claim 1, wherein the machine learning module is at least partially locally provided on the component.

8. The method according to claim 1, wherein the measured value data set comprises signal characteristics over time.

9. A parameterization unit for a component for use in an automation system configured to perform the method according to claim 1, the parameterization unit comprising:
a parameter interface for reading a basic parameterization;
at least one measured value interface for measuring and/or reading in a measured value data set;
an interface to a machine learning module, via which a result message can be read in to adapt the basic parameterization; and
a processor for controlling and operating the component with the basic parameterization or target parameterization.

10. A component for an automation system comprising a parameterization unit according to claim 9.

11. The component according to claim 10, further comprising:
a control unit and in particular a controller for an electrical or a pneumatic system, and/or
wherein the automation system comprises an electrical and/or pneumatic actuator.

12. A method for testing a basic parameterization of a component in an automation system, in which the following method steps are carried out before or during commissioning of the component in the automation system:
starting a test run of the component in the automation system with the basic parameterization, wherein the component is a technical part or field device that is electronically controllable;
measuring of a measured value data record during trial operation;
assessing a machine learning module, which is pre-trained in order to calculate a target parameterization for the respective component for a measured value data set and wherein the basic parameterization is compared with the calculated target parameterization and in the event of deviation a result message for adapting the basic parameterization is provided, wherein a specific machine learning module is pre-trained for each individual component; and
receiving the provided result message for adaptation of the basic parameterization,
wherein the machine learning module comprises a component test unit which is trained to test whether the respective component is correctly inserted in the automation system in order to fulfill a predetermined automation task and, if the answer is no, extends the result message with an exchange message.

13. The method according to claim 12, wherein the machine learning module is continuously retrained with the continuously acquired measured value data set, the basic parameterization and the calculated target parameterization.

14. The method according to claim 12, wherein the machine learning module comprises a pre-trained neural network which is trained with laboratory data and/or data from test stands and/or data from at least one simulation model.

15. The method according to claim 12, wherein the machine learning module is trained to automatically recognize error patterns in the basic parameterization.

16. The method according to claim 12, wherein the machine learning module is designed to apply at least one pattern recognition algorithm to the measured value data set.

17. The method according to claim 12, wherein the machine learning module is at least partially locally provided on the component.

18. The method according to claim 12, wherein the measured value data set comprises signal characteristics over time.

19. A parameterization unit for a component for use in an automation system configured to perform the method according to claim 13, the parameterization unit comprising:
a parameter interface for reading a basic parameterization;
at least one measured value interface for measuring and/or reading in a measured value data set;
an interface to a machine learning module, via which a result message can be read in to adapt the basic parameterization; and
a processor for controlling and operating the component with the basic parameterization or target parameterization.

20. A component for an automation system comprising a parameterization unit according to claim 19.

21. The component according to claim 20, further comprising:
a control unit and in particular a controller for an electrical or a pneumatic system, and/or
wherein the automation system comprises an electrical and/or pneumatic actuator.

* * * * *

UNITED STATES PATENT AND TRADEMARK OFFICE
CERTIFICATE OF CORRECTION

PATENT NO. : 11,960,251 B2  
APPLICATION NO. : 17/113039  
DATED : April 16, 2024  
INVENTOR(S) : Martin Thierauf, Thomas Ruschival and Dominic Kraus Page 1 of 1

It is certified that error appears in the above-identified patent and that said Letters Patent is hereby corrected as shown below:

In the Claims

For Column 10, Claim 1:  
Line 7: Replace "assessing," with "accessing"

For Column 11, Claim 12:  
Line 19: Replace "assessing," with "accessing"

Signed and Sealed this  
Second Day of September, 2025

Coke Morgan Stewart  
*Acting Director of the United States Patent and Trademark Office*